(12) United States Patent
Nishihata

(10) Patent No.: US 9,705,543 B2
(45) Date of Patent: Jul. 11, 2017

(54) COMMUNICATION SYSTEM, FREQUENCY CONTROL METHOD, REMOTE TERMINAL AND NON-TRANSITORY COMPUTER-READABLE RECORDING MEDIUM HAVING STORED THEREIN PROGRAM

(71) Applicant: ICOM INCORPORATED, Osaka (JP)

(72) Inventor: Masaaki Nishihata, Osaka (JP)

(73) Assignee: ICOM Incorporated, Osaka (JP)

( * ) Notice: Subject to any disclaimer, the term of this patent is extended or adjusted under 35 U.S.C. 154(b) by 0 days.

(21) Appl. No.: 15/251,039

(22) Filed: Aug. 30, 2016

(65) Prior Publication Data
US 2017/0063409 A1 Mar. 2, 2017

(30) Foreign Application Priority Data
Aug. 31, 2015 (JP) .................................. 2015-170524

(51) Int. Cl.
*H04B 1/26* (2006.01)
*H04B 1/10* (2006.01)
*H04B 1/40* (2015.01)

(52) U.S. Cl.
CPC ............. *H04B 1/1027* (2013.01); *H04B 1/26* (2013.01); *H04B 1/40* (2013.01); *H04B 2001/1072* (2013.01)

(58) Field of Classification Search
CPC . H04B 1/1027; H04B 1/26; H04B 2001/1072
USPC ...... 455/205, 293, 312, 20, 131, 190.1, 313, 455/323; 348/725, 726
See application file for complete search history.

(56) References Cited

U.S. PATENT DOCUMENTS

| 7,907,218 | B2 * | 3/2011 | Shintani | ............... | H04N 5/4401 |
| | | | | | 348/725 |
| 2007/0146550 | A1 * | 6/2007 | Ikuma | ...................... | H03J 7/04 |
| | | | | | 348/726 |
| 2007/0216806 | A1 * | 9/2007 | Maehara | .............. | H04N 5/4401 |
| | | | | | 348/565 |

(Continued)

FOREIGN PATENT DOCUMENTS

JP 2005-192084 7/2005

*Primary Examiner* — Sonny Trinh
(74) *Attorney, Agent, or Firm* — Warner Norcross & Judd LLP

(57) ABSTRACT

A wireless-device-end communicator transmits, to a remote-end communicator, an IF signal and a wireless-device-end AF signal, the wireless-device-end AF signal being generated by demodulating the IF signal on a basis of a wireless-device-end local frequency. A remote-end controller starts a tuning mode when an instruction obtainer obtains the start instruction for the tuning mode, and adjusts a remote-end local frequency in accordance with the obtained adjustment instruction. A remote end demodulator demodulates the received IF signal on a basis of the remote-end local frequency, and outputs a remote-end AF signal. An outputter outputs the remote-end AF signal in the tuning mode, and outputs the wireless-device-end AF signal in a normal mode. At an end of the tuning mode, the wireless-device-end local frequency is adjusted in such a way that the reception frequency of a wireless device becomes consistent with the reception frequency indicated by the last adjustment instruction.

15 Claims, 6 Drawing Sheets

(56) References Cited

U.S. PATENT DOCUMENTS

2010/0284541 A1\* 11/2010 Taira .................... H03G 3/3068
381/1
2016/0087661 A1\* 3/2016 Narita .................... H04L 27/14
455/205

\* cited by examiner

COMMUNICATION SYSTEM, FREQUENCY CONTROL METHOD, REMOTE TERMINAL AND NON-TRANSITORY COMPUTER-READABLE RECORDING MEDIUM HAVING STORED THEREIN PROGRAM

CROSS-REFERENCE TO RELATED APPLICATION

This application claims the benefit of Japanese Patent Application No. 2015-170524, filed on Aug. 31, 2015, the entire disclosure of which is incorporated by reference herein.

FIELD

This application relates generally to a communication system, a frequency control method, a remote terminal and a non-transitory computer-readable recording medium having stored therein a program.

BACKGROUND

Technologies of remotely controlling a wireless device from a terminal connected thereto via a network have been developed. For example, Unexamined Japanese Patent Application Kokai Publication No. 2005-192084 discloses a host-end wireless device control device that causes an amateur wireless device to stop emitting radio waves when a network communication with a terminal PC is unsuccessful.

SUMMARY

A communication system according to a first aspect of the present disclosure includes a wireless device and a remote terminal connected to the wireless device via a communication network, and has a tuning mode for a tuning operation, in which:

the wireless device includes:
a frequency converter to perform, on a basis of a wireless-device-end local frequency, a frequency conversion on a reception signal on a basis of a radio wave captured by an antenna, and output an IF signal that is an intermediate frequency signal;
a wireless-device-end demodulator to demodulate the IF signal, and output a wireless-device-end AF signal that is the demodulated signal;
a wireless-device-end communicator to transmit the IF signal and the wireless-device-end AF signal to the remote terminal, and exchange a control signal with the remote terminal; and
a wireless-device-end controller to adjust the wireless-device-end local frequency,
the remote terminal includes:
an instruction obtainer to obtain an adjustment instruction of a reception frequency;
a remote-end communicator to receive the IF signal and the wireless-device-end AF signal from the wireless device, and exchange a control signal with the wireless device;
a remote-end demodulator to demodulate the received IF signal on a basis of a remote-end local frequency, and output a remote-end AF signal that is the demodulated signal;
a remote-end controller to adjust the remote-end local frequency in accordance with the adjustment instruction obtained by the instruction obtainer in the tuning mode; and
an outputter to output the remote-end AF signal output by the remote-end demodulator in the tuning mode, and output the wireless-device-end AF signal received by the remote-end communicator in a mode other than the tuning mode,
the remote-end communicator is to transmit the control signal representing the last adjustment instruction at an end of the tuning mode; and
when the wireless-device-end communicator receives the control signal representing the last adjustment instruction, the wireless-device-end controller is to adjust the wireless-device-end local frequency in accordance with the last adjustment instruction.

Preferably, when the reception frequency indicated by the adjustment instruction in the tuning mode exceeds a defined band, the remote-end communicator transmits the control signal representing the adjustment instruction; and
when the wireless-device-end communicator receives the control signal representing the adjustment instruction, the wireless-device-end controller adjusts the wireless-device-end local frequency in accordance with the adjustment instruction.

Preferably, the remote-end communicator transmits, the control signal for a notification of a start of the tuning mode at the start of the tuning mode, and transmits the control signal for a notification of an end of the tuning mode at the end of the tuning mode;
the wireless-device-end communicator receives the control signal for the notification of the start of the tuning mode and the end of the tuning mode, transmits the IF signal in the tuning mode and transmits the wireless-device-end AF signal in the mode other than the tuning mode in accordance with the control signal; and
the remote-end communicator receives the IF signal in the tuning mode, and receives the wireless-device-end AF signal in the mode other than the tuning mode.

Preferably, in both the tuning mode and the mode other than the tuning mode, the wireless-device-end communicator transmits both the IF signal and the wireless-device-end AF signal, and the remote-end communicator receives both the IF signal and the wireless-device-end AF signal.

A frequency control method according to a second aspect of the present disclosure is executed by a communication system including a wireless device and a remote terminal connected to the wireless device via a communication network, and including a tuning mode for a tuning operation, and the method includes:
performing, on a basis of a wireless-device-end local frequency, a frequency conversion on a reception signal on a basis of a radio wave captured by an antenna of the wireless device to generate an IF signal that is an intermediate frequency signal;
generating, at the wireless device, a wireless-device-end AF signal that is the demodulated IF signal;
generating, at the remote terminal, a remote-end AF signal that is the demodulated IF signal on a basis of a remote-end local frequency;
obtaining an adjustment instruction of a reception frequency;
adjusting, in the tuning mode, the remote-end local frequency in accordance with the obtained adjustment instruction, and adjusting the wireless-device-end local frequency in accordance with the last adjustment instruction at an end of the tuning mode; and
outputting the remote-end AF signal from the remote terminal in the tuning mode, and outputting the wireless-device-end AF signal from the remote terminal in a mode other than the tuning mode.

Preferably, when the reception frequency indicated by the adjustment instruction in the tuning mode exceeds a defined band, the wireless-device-end local frequency is adjusted in accordance with the adjustment instruction.

A remote terminal according to a third aspect of the present disclosure includes a tuning mode for a tuning operation, and the remote terminal includes:

an instruction obtainer to obtain an adjustment instruction of a reception frequency for a wireless device connected via a communication network;

a remote-end communicator to receive, from the wireless device, an IF signal that is an intermediate frequency signal generated by performing, on a basis of a wireless-device-end local frequency, a frequency conversion on a reception signal on a basis of a radio wave captured by an antenna of the wireless device, and a wireless-device-end AF signal that is a signal generated by demodulating the IF signal, and exchange a control signal with the wireless device;

a remote-end demodulator to demodulate the received IF signal on a basis of a remote-end local frequency, and output a remote-end AF signal that is the demodulated signal;

a remote-end controller to adjust the remote-end local frequency in accordance with the adjustment instruction obtained by the instruction obtainer in the tuning mode; and an outputter to output the remote-end AF signal output by the remote-end demodulator in the tuning mode, and output the wireless-device-end AF signal received by the remote-end communicator in a mode other than the tuning mode, in which the remote-end communicator is to transmit the control signal representing the last adjustment instruction at an end of the tuning mode.

Preferably, the remote-end communicator transmits, when the reception frequency indicated by the adjustment instruction in the tuning mode exceeds a defined band, the control signal representing the adjustment instruction.

Preferably, the remote-end communicator transmits the control signal for a notification of a start of the tuning mode at the start of the tuning mode, transmits the control signal for a notification of an end of the tuning mode at the end of the tuning mode, receives the IF signal in the tuning mode, and receives the wireless-device-end AF signal in the mode other than the tuning mode.

Preferably, in both the tuning mode and the mode other than the tuning mode, the remote-end communicator receives both the IF signal and the wireless-device-end AF signal.

A non-transitory computer-readable recording medium according to a fourth aspect of the present disclosure has stored therein a program that causes a computer to:

obtain an adjustment instruction of a reception frequency for a wireless device connected via a communication network;

receive an IF signal that is an intermediate frequency signal generated by performing, on a basis of a wireless-device-end local frequency, a frequency conversion on a reception signal on a basis of a radio wave captured by an antenna of the wireless device, and a wireless-device-end AF signal that is a signal generated by demodulating the IF signal;

demodulate the received IF signal on a basis of a remote-end local frequency, and generate a remote-end AF signal that is the demodulated signal;

adjust the remote-end local frequency in accordance with the obtained adjustment instruction in a tuning mode for a tuning operation;

output the remote-end AF signal generated by demodulating the received IF signal in the tuning mode, and output the received wireless-device-end AF signal in a mode other than the tuning mode; and transmit a control signal representing the last adjustment instruction at an end of the tuning mode to the wireless device.

According to the present disclosure, the tuning operation of the wireless device through an operation at the remote terminal connected thereto via the communication network is facilitated.

BRIEF DESCRIPTION OF THE DRAWINGS

A more complete understanding of this application can be obtained when the following detailed description is considered in conjunction with the following drawings, in which.

DETAILED DESCRIPTION

Figure 1:
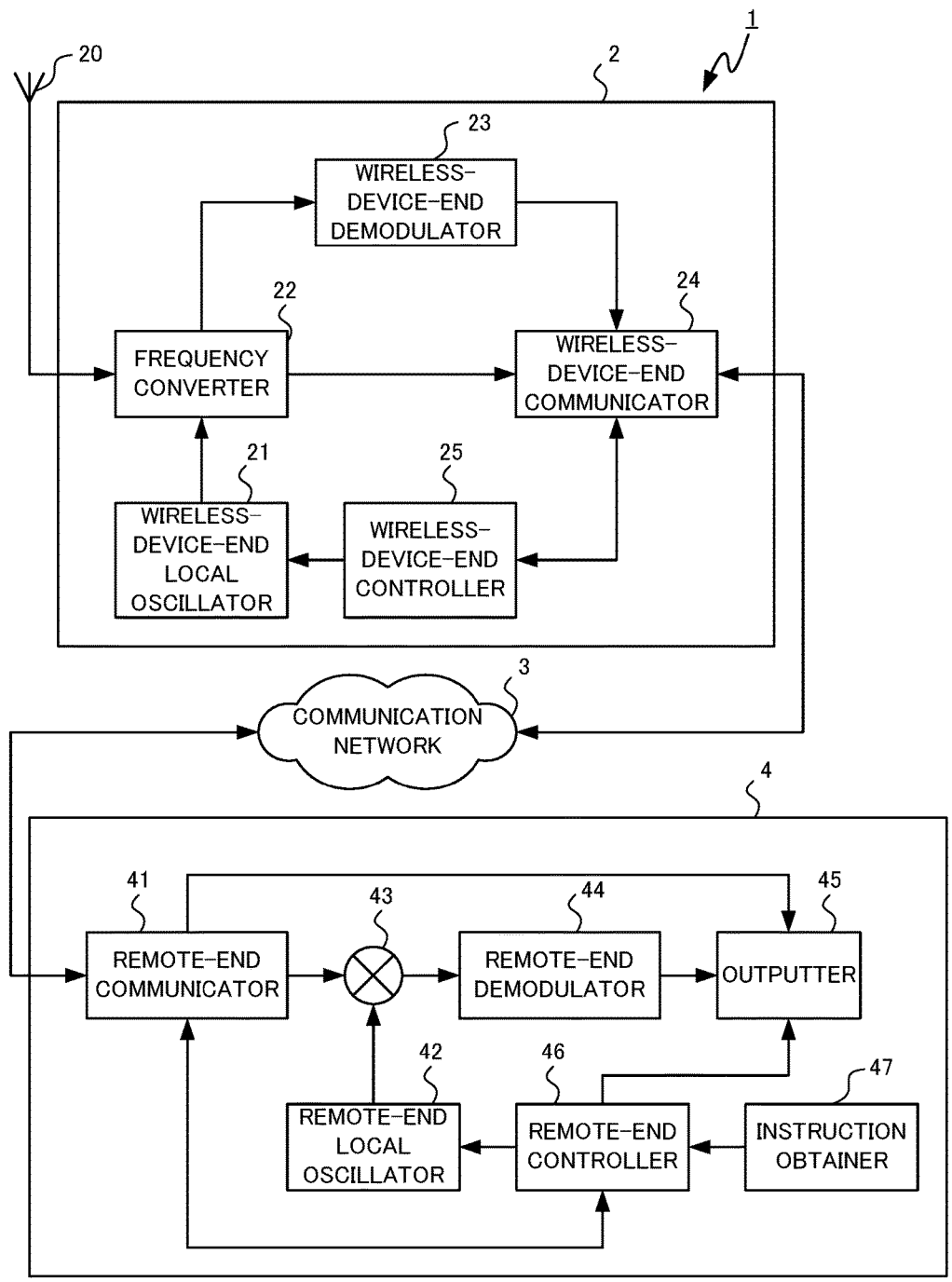
FIG. 1 is a block diagram illustrating an example configuration of a communication system according to a first embodiment of the present disclosure.

In a Single Side Band (SSB) communication, a Morse wireless communication, a Radioteletype (RTTY) communication and an Amplitude Modulation (AM) communication, a tuning operation of adjusting the reception frequency of a wireless device and of tuning with received radio waves is necessary.

In typical wireless devices, a user adjusts the reception frequency of the wireless device while listening to a received tone, and the tuning operation is performed in accordance with the user's adjustment operation. According to communication systems that enable remote control of a wireless device, a user adjusts, at a remote terminal connected to the wireless device via a network, the reception frequency, and the tuning operation is performed in accordance with the user's adjustment operation. In such communication systems, the wireless device demodulates an Intermediate Frequency (IF) signal and generates an Audio Frequency (AF) signal, the AF signal is transmitted to the remote terminal via the network, and sounds are reproduced by the remote terminal. According to such communication systems, since the AF signals are transmitted to the remote terminal via the network, a time lag occurs after the user adjusts the reception frequency and until the AF signal having undergone the frequency adjustment is received. Hence, the operation at the remote terminal for the tuning operation is difficult.

The present disclosure has been made in view of the aforementioned circumstances, and an objective of the present disclosure is to facilitate a tuning operation of a wireless device through an operation given to a remote terminal connected thereto via a communication network.

Embodiments of the present disclosure will be explained below in detail with reference to the accompanying figures. The same or equivalent component will be denoted by the same reference numeral throughout the figures.

First Embodiment

FIG. 1 is a block diagram illustrating an example configuration of a communication system according to a first embodiment of the present disclosure. A communication system 1 includes a wireless device 2, and a remote terminal 4 connected thereto via a communication network 3. The communication network 3 is an arbitrary network like the Internet. The communication system 1 has a normal mode and a tuning mode in the adjustment of the reception frequency of the wireless device 2. The detail of the normal mode and that of the tuning mode will be explained later. The communication system 1 causes, in the tuning mode, the remote terminal 4 to demodulate an Intermediate Frequency (IF) signal in accordance with an adjustment instruction which is obtained by the remote terminal 4, and which is to adjust the reception frequency, and outputs an Audio Frequency (AF) signal that is the demodulated signal.

The wireless device 2 includes an antenna 20, a wireless-device-end local oscillator 21, a frequency converter 22, a wireless-device-end demodulator 23, a wireless-device-end communicator 24, and a wireless-device-end controller 25. The antenna 20 captures radio waves, and generates reception signals. The wireless-device-end local oscillator 21 outputs wireless-device-end local signals. The frequency converter 22 performs a frequency conversion on the reception signal on the basis of a wireless-device-end local frequency that is the frequency of the wireless-device-end local signal, and outputs an IF signal. The wireless-device-end demodulator 23 demodulates the IF signal, and outputs a wireless-device-end AF signal that is the demodulated IF signal. The wireless-device-end communicator 24 transmits the IF signal and the wireless-device-end AF signal to the remote terminal 4, and exchanges control signals with the remote terminal 4. The wireless-device-end controller 25 adjusts the wireless-device-end local frequency. The wireless-device-end local oscillator 21, the frequency converter 22, and the wireless-device-end demodulator 23 may be accomplished by a Digital Signal Processor (DSP).

The remote terminal 4 includes a remote-end communicator 41, a remote-end local oscillator 42, a mixer 43, a remote-end demodulator 44, an outputter 45, a remote-end controller 46, and an instruction obtainer 47. The remote-end communicator 41 receives the IF signal and the wireless-device-end AF signal from the wireless device 2, and exchanges the control signals therewith. The remote-end local oscillator 42 outputs remote-end local signals. The mixer 43 mixes the received IF signal and the remote-end local signal, and outputs a remote-end IF signal. The remote-end demodulator 44 demodulates the remote-end IF signal, and outputs the remote-end AF signal that is the demodulated remote-end IF signal. The outputter 45 outputs the received wireless-device-end AF signal or the output remote-end AF signal output by the remote-end demodulator 44. The remote-end controller 46 adjusts the remote-end local frequency that is the frequency of the remote-end local signal. The instruction obtainer 47 obtains the adjustment instruction for the reception frequency. The remote-end local oscillator 42, the mixer 43, and the remote-end demodulator 44 may be accomplished by a DSP.

The wireless-device-end communicator 24 and the remote-end communicator 41 each generate communication frames compatible with the communication network 3, and exchange the wireless-device-end AF signals, the IF signals, and the control signals. The wireless-device-end controller 25 and the remote-end controller 46 each include a processor that has a Central Processing Unit (CPU) and an internal memory, and the like, and a memory like a Random Access Memory (RAM) and a flash memory. The wireless-device-end controller 25 and the remote-end controller 46 each execute a control program stored in the memory, and control each component of the wireless device 2 and that of the remote terminal 4 in addition to the adjustment of the wireless-device-end local frequency and that of the remote-end local frequency as explained above.

While no adjustment of the reception frequency of the wireless device 2 is performed, the communication system 1 outputs the remote-end AF signal from the outputter 45 that is, for example, a speaker. In the normal mode, the control system 1 controls the wireless-device-end local oscillator 21 in accordance with the adjustment instruction of the reception frequency obtained by the instruction obtainer 47, adjusts the wireless-device-end local frequency of the wireless device 2, and outputs the wireless-device-end AF signal from the outputter 45. In the tuning mode, the communication system 1 adjusts the remote-end local frequency in accordance with the adjustment instruction of the reception frequency obtained by the instruction obtainer 47, and outputs the remote-end AF signal from the outputter 45.

The operation of each component of the communication system 1 in the normal mode will be explained. The instruction obtainer 47 obtains the adjustment instruction that is a user operation given to the operation part of the remote terminal 4. When the instruction obtainer 47 obtains the adjustment instruction, the instruction obtainer 47 transmits the adjustment instruction to the remote-end controller 46. The remote-end controller 46 transmits the adjustment instruction to the remote-end communicator 41. The remote-end communicator 41 transmits a control signal representing the adjustment instruction to the wireless-device-end communicator 24. When the wireless-device-end communicator 24 receives the control signals, the wireless-device-end controller 25 controls the wireless-device-end local oscillator 21 in accordance with the adjustment instruction represented by the control signals, thereby adjusting the wireless-device-end local frequency of the wireless device 2. The wireless-device-end communicator 24 transmits the wireless-device-end AF signal, and the outputter 45 outputs the wireless-device-end AF signal which is received by the remote-end communicator 41.

An explanation will be given of each component of the communication system 1 from the start of the tuning mode and until the end thereof. When the instruction obtainer 47 obtains the start instruction for the tuning mode, the instruction obtainer 47 notifies the remote-end controller 46 of the start of the tuning mode. When notified of the start of the tuning mode, the remote-end controller 46 starts the tuning mode. The instruction obtainer 47 obtains the adjustment instruction that is a user operation given to the operation part of the remote terminal 4 in the tuning mode. The remote-end controller 46 controls the remote-end local oscillator 42 in accordance with the adjustment instruction obtained by the instruction obtainer 47 in the tuning mode, and adjusts the remote-end local frequency. That is, the remote-end local frequency is adjusted in accordance with the reception frequency indicated by the adjustment instruction.

The remote-end demodulator 44 demodulates the IF signal received by the remote-end communicator 41 on the basis of the remote-end local frequency, and outputs the remote-end AF signal. In the example illustrated in FIG. 1, the remote-end demodulator 44 demodulates a remote-end IF signal generated by mixing the received IF signal with the remote-end local signal by the mixer 43, and outputs the remote-end AF signal. In the tuning mode, since the remote-end local frequency is adjusted, the remote-end demodulator 44 demodulates the received IF signal on the basis of the remote-end local frequency adjusted in accordance with the adjustment instruction, and outputs the remote-end AF signal. The outputter 45 outputs the remote-end AF signal in the tuning mode. Hence, when the adjustment of the reception frequency is instructed by the user operation, the remote terminal 4 generates a new remote-end AF signal having undergone the frequency adjustment, and this remote-end AF signal is output. Through the above operation by the communication system 1, a time after the user gives an operation of adjusting the reception frequency and until the new AF signal having undergone the frequency adjustment is output can be reduced. This facilitates the tuning operation through an operation given to the remote terminal 4.

The instruction obtainer 47 notifies the remote-end controller 46 of the end of the tuning mode when the end instruction for the tuning mode is obtained. When notified of the end of the tuning mode, the remote-end controller 46 transmits, to the remote-end communicator 41, the last adjustment instruction at the end of the tuning mode, that is, the latest adjustment instruction given prior to the end of the tuning mode. The remote-end communicator 41 transmits a control signal representing the adjustment instruction to the wireless-device-end communicator 24. When the wireless-device-end communicator 24 receives the control signals, the wireless-device-end controller 25 controls the wireless-device-end local oscillator 21 in accordance with the adjustment instruction represented by the control signals, thereby adjusting the wireless-device-end local frequency of the wireless device 2. That is, the wireless-device-end local frequency of the wireless device 2 is adjusted in such a way that the reception frequency of the wireless device 2 becomes consistent with the frequency indicated by the last adjustment instruction at the end of the tuning mode.

The operation part of the remote terminal 4 includes, in addition to a normal dial for roughly adjusting the reception frequency in the normal mode, a dial which is dedicated for an adjustment only, and which is for finely adjusting the reception frequency in the tuning mode. In this case, when detecting an operation given to the adjustment dedicated dial, the instruction obtainer 47 determines that the start instruction for the tuning mode is obtained, and notifies the remote-end controller 46 of the start of the tuning mode. The instruction obtainer 47 obtains the adjustment instruction that is an operation given to the adjustment dedicated dial in the tuning mode, and the remote-end local frequency is adjusted in accordance with the adjustment instruction. When detecting that no operation is given to the adjustment dedicated dial for a certain time period, the instruction obtainer 47 determines that the end instruction for the tuning mode is obtained, and notifies the remote-end controller 46 of the end of the tuning mode. The normal dial and the adjustment dedicated dial are not limited to physical dials, and may be dial-shape icons displayed on a touch panel. When the normal dial is operated, the wireless-device-end local frequency of the wireless device 2 is adjusted in accordance with the reception frequency indicated by the operation given to the normal dial. The adjustment dedicated dial is designed so as to adjust the frequency finer than the normal dial. The shape of the operation part is not limited to the dial, and is optional, provided that the operation part enables the adjustment of the frequency.

In addition, the operation part of the remote terminal 4 may include a dial for adjusting the reception frequency and a mode-change switch that changes the mode between the normal mode and the tuning mode. In this case, when detecting that the mode-change switch is operated in the normal mode, the instruction obtainer 47 determines that the start instruction for the tuning mode is obtained, and notifies the remote-end controller 46 of the start of the tuning mode. The instruction obtainer 47 obtains the adjustment instruction that is the operation given to the dial in the tuning mode, and the remote-end local frequency is adjusted in accordance with the adjustment instruction. When detecting that the mode-change switch is operated in the tuning mode, the instruction obtainer 47 determines that the end instruction for the tuning mode is obtained, and notifies the remote-end controller 46 of the end of the tuning mode. Such a dial is utilized to adjust the reception frequency in both the normal mode and the tuning mode. The adjustment level of the frequency relative to the operation level to the dial in the tuning mode is set to be smaller than the adjustment level of the frequency relative to the operation level to the dial in the normal mode, enabling a finer reception frequency adjustment in the tuning mode than in the normal mode. The mode-change switch is not limited to a physical switch, and is optional, provided that the mode-change switch enables switching between the tuning mode and the normal mode. The mode-change switch may be an icon displayed on the touch panel.

Figure 2:
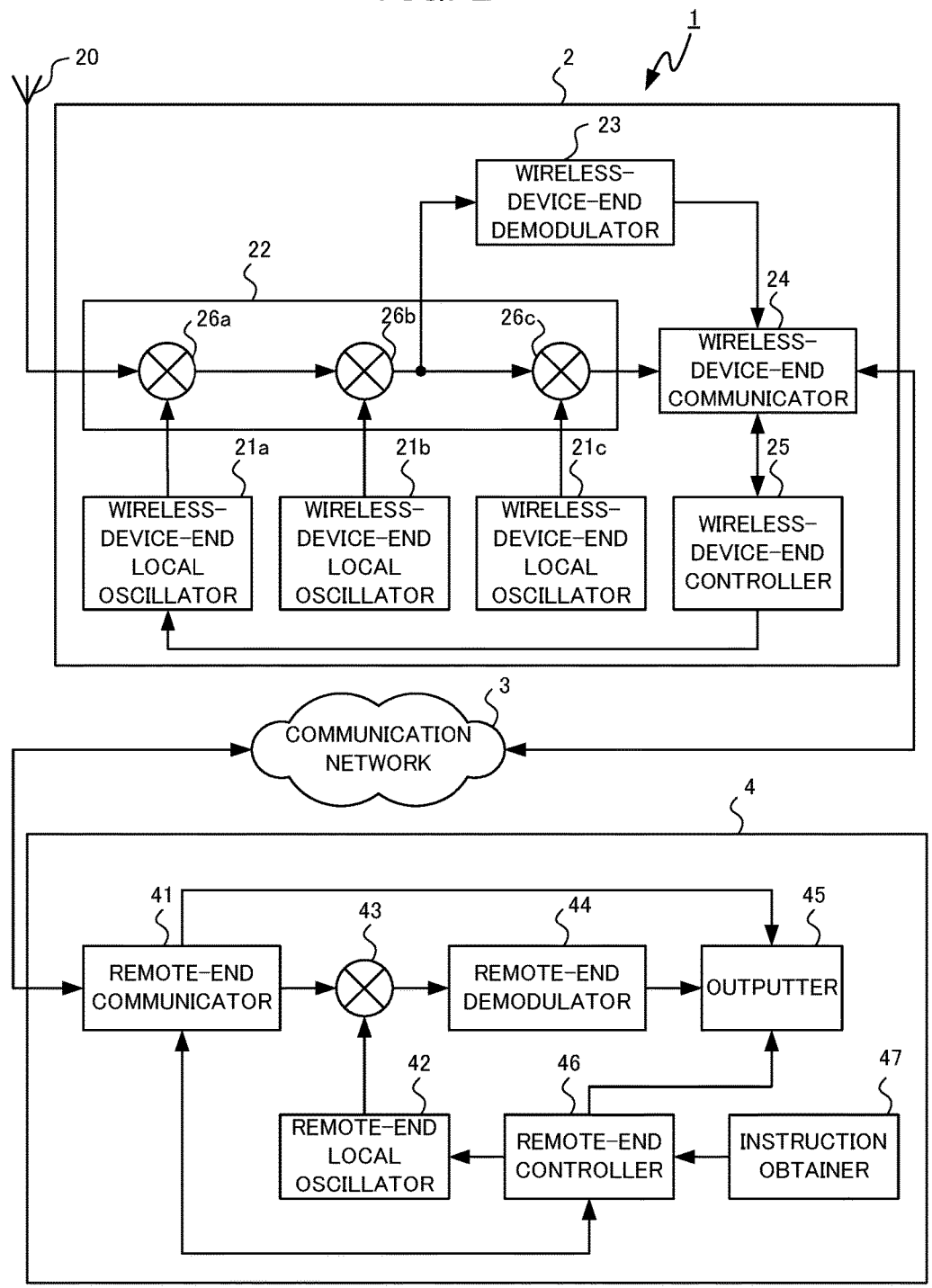
FIG. 2 is a block diagram illustrating an example configuration of the communication system according to the first embodiment.

FIG. 2 is a block diagram illustrating an example configuration of the communication system according to the first embodiment. The wireless device 2 includes wireless-device-end local oscillators 21a, 21b and 21c, and the frequency converter 22 includes mixers 26a, 26b, and 26c. A first wireless-device-end local signal output by the wireless-device-end local oscillator 21a is input to the mixer 26a, a second wireless-device-end local signal output by the wireless-device-end local oscillator 21b is input to the mixer 26b, and a third wireless-device-end local signal output by the wireless-device-end local oscillator 21c is input to the mixer 26c. The mixer 26a mixes the reception signal with the first wireless-device-end local signal, and outputs a first IF signal. The mixer 26b mixes the first IF signal with the second wireless-device-end local signal, and outputs a second IF signal. The mixer 26c mixes the second IF signal with the third wireless-device-end local signal, and outputs a third IF signal. The wireless-device-end demodulator 23 demodulates the second IF signal, and outputs the wireless-device-end AF signal. The wireless-device-end communicator 24 transmits the wireless-device-end AF signal and the third IF signal to the remote-end communicator 41.

When, for example, the frequency of the reception signal is between 30 kHz and 60 MHz, the frequency of the first IF signal is 64.455 MHz, the frequency of the second IF signal is 36 kHz, and the frequency of the third IF signal is 12 kHz. In addition, the third IF signal has a necessary bandwidth for the tuning operation, for example, ±12 kHz. In the example illustrated in FIG. 2, when the wireless-device-end communicator 24 receives the control signal representing the adjustment instruction, the wireless-device-end controller 25 controls the wireless-device-end local oscillator 21a in accordance with the adjustment instruction represented by the control signal, thereby adjusting the first wireless-device-end local frequency that is the frequency of the first wireless-device-end local signal.

Figure 3:
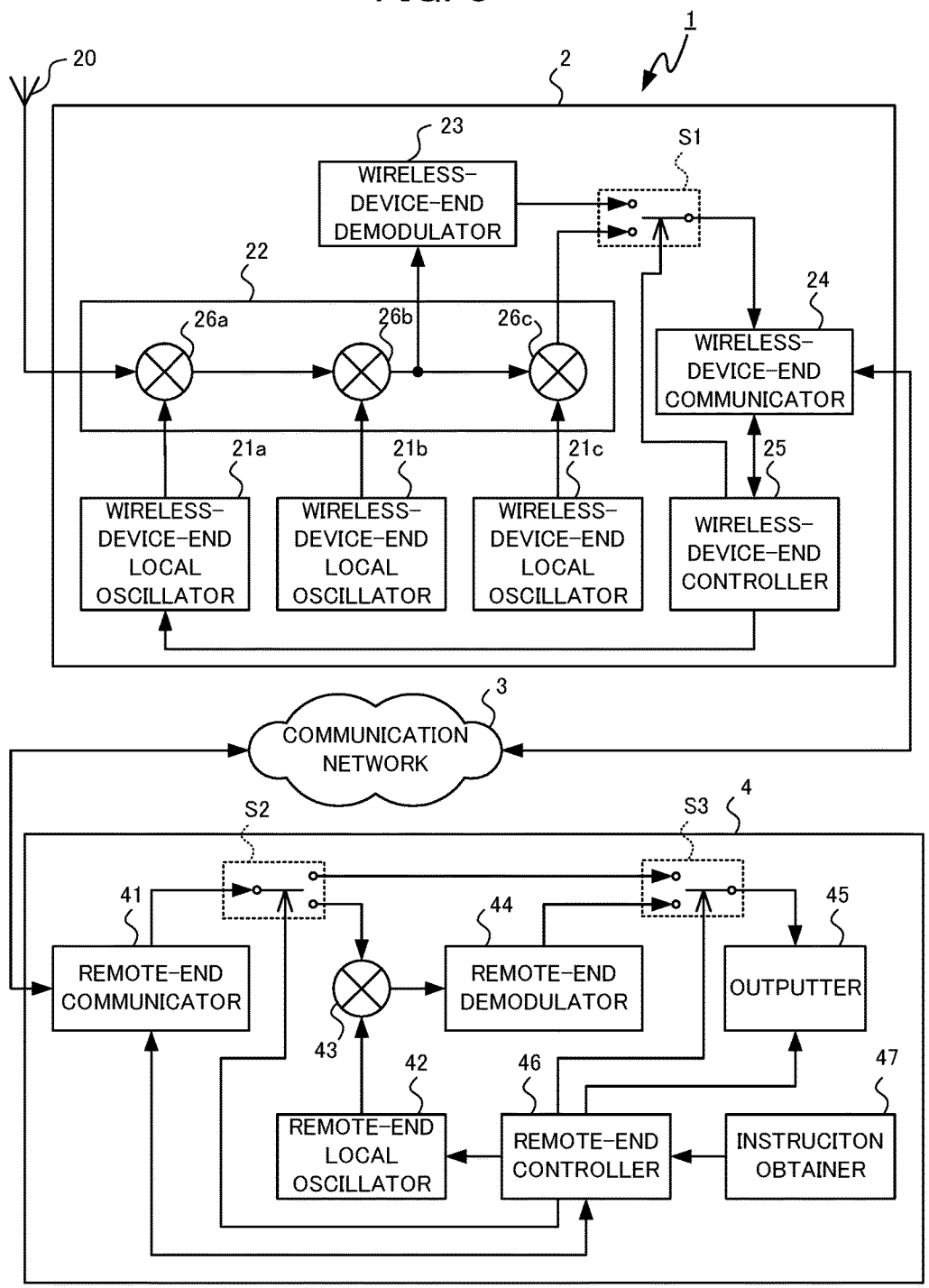
FIG. 3 is a block diagram illustrating an example configuration of the communication system according to the first embodiment.

FIG. 3 is a block diagram illustrating an example configuration of the communication system according to the first embodiment. In a case in which the wireless-device-end communicator 24 transmits the IF signal in the tuning mode, and transmits the wireless-device-end AF signal in the normal mode, like the example illustrated in FIG. 3, the wireless device 2 includes a switch S1, and the remote terminal 4 includes switches S2 and S3. The wireless-device-end controller 25 controls the switch S1, while the remote-end controller 46 controls the switches S2 and S3. In addition, the remote-end controller 46 notifies the remote-end communicator 41 of the start of the tuning mode and the end thereof. The remote-end communicator 41 transmits, to the wireless-device-end communicator 24, control signals for a notification of the start of the tuning mode at the time of the start of the tuning mode, and transmits, to the wireless-device-end communicator 24, control signals for a notification of the end of the tuning mode at the time of the end of the tuning mode. The wireless-device-end communicator 24 receives the control signals for the notification of the start of the tuning mode and the end thereof, and notifies the wireless-device-end controller 25 of the start of the tuning mode and the end thereof in accordance with the received control signal.

The wireless-device-end controller 25 controls the switch S1 in such a way that the output by the mixer 26c is input to the wireless-device-end communicator 24 in the tuning mode, and controls the switch S1 in such a way that the output by the wireless-device-end demodulator 23 is input to the wireless-device-end communicator 24 in the normal mode. This causes the wireless-device-end communicator 24 to transmit the third IF signal in the tuning mode, and to transmit the wireless-device-end AF signal in the normal mode. In addition, the remote-end controller 46 controls the switch S2 in such a way that the output by the remote-end communicator 41 is input to the mixer 43 in the tuning mode, and controls the switch S3 in such a way that the output by the remote-end demodulator 44 is input to the outputter 45 in the tuning mode. The remote-end controller 46 controls the switches S2 and S3 in such a way that the output by the remote-end communicator 41 is input to the outputter 45 in the normal mode.

In addition, the wireless-device-end communicator 24 may transmit both the wireless-device-end AF signal and the IF signal in both the normal mode and the tuning mode. In this case, for example, the switches S1 and S2 of the communication system 1 in FIG. 3 are omitted. In both the normal mode and the tuning mode, in the wireless device 2, the wireless-device-end AF signal output by the wireless-device-end demodulator 23 and the IF signal output by the mixer 26c are both input to the wireless-device-end communicator 24. Next, the wireless-device-end communicator 24 transmits, to the communication network 3, the input wireless-device-end AF signal and IF signal independently. In addition, in both the normal mode and the tuning mode, in the remote terminal 4, the received wireless-device-end AF signal by the remote-end communicator 41 is directly input to the switch S3, and the IF signal is mixed with the remote-end local signal by the mixer 43, demodulated by the remote-end demodulator 44, and is input to the switch S3. Still further, the remote terminal 4 controls the switch S3 in such a way that the received wireless-device-end AF signal is input to the outputter 45 in the normal mode, and controls the switch S3 in such a way that the remote-end AF signal output by the remote-end demodulator 44 is input to the outputter 45 in the tuning mode.

As explained above, when the wireless device 2 transmits both the wireless-device-end AF signal and the IF signal, the necessary time for the switch operations of the switches S1, and S2 can be reduced. In particular, when the mode is transitioned from the normal mode to the tuning mode which does not need an adjustment of the wireless-device-end local frequency of the wireless device 2, the mode can be instantaneously transitioned to the tuning mode by merely the operation of the switch S3 of the remote terminal 4 without an exchange of the control signal via the communication network 3.

Figure 4:
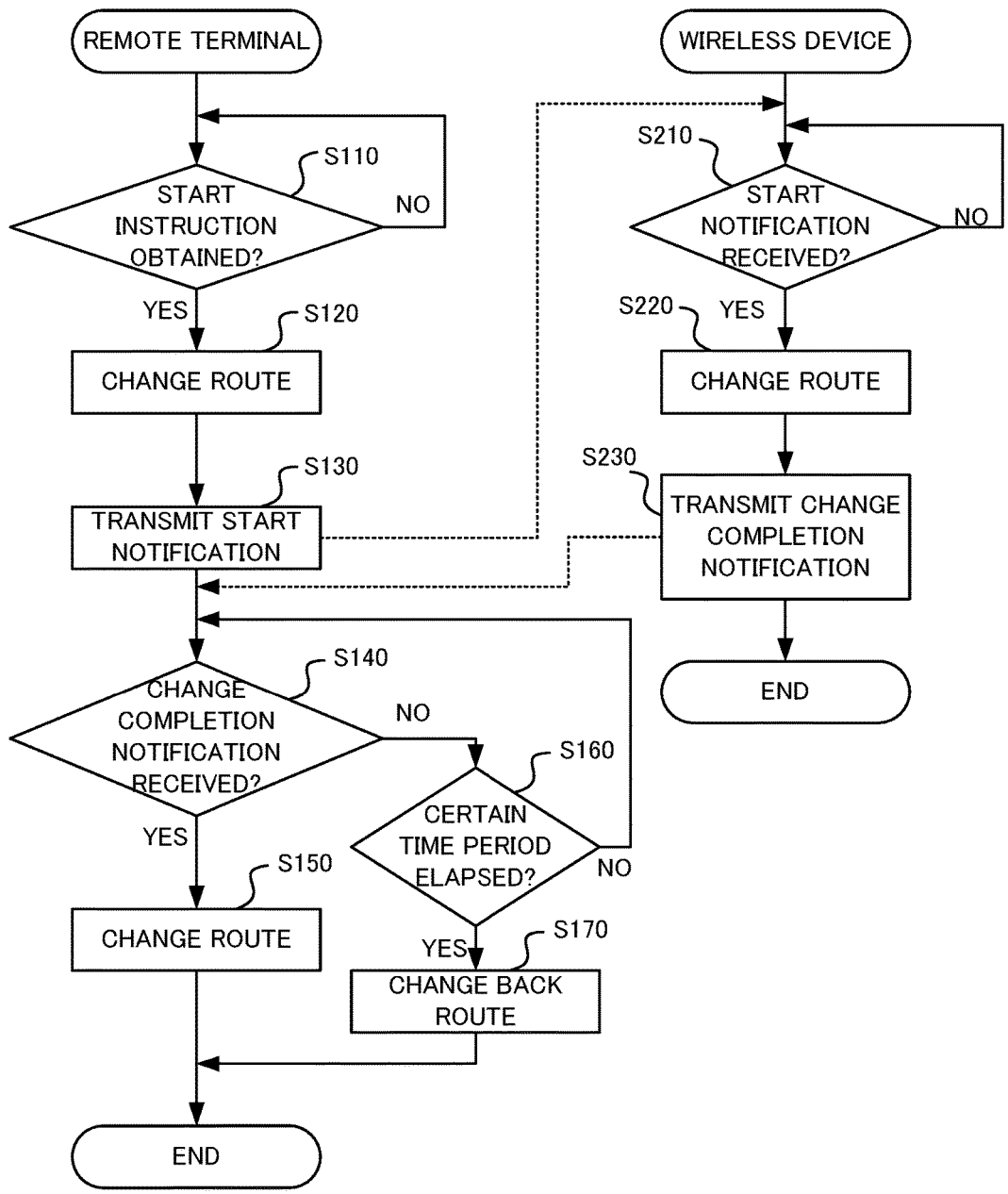
FIG. 4 is a flowchart illustrating an example operation of starting a tuning mode performed by the communication system according to the first embodiment.

The operation for starting the tuning mode and for ending the tuning mode in the communication system 1 illustrated in FIG. 3 will be explained below. FIG. 4 is a flowchart illustrating an example operation of starting the tuning mode performed by the communication system 1 according to the first embodiment. An explanation will be given of the operation of starting the tuning mode performed by the communication system 1 illustrated in FIG. 3. When the instruction obtainer 47 of the remote terminal 4 has not obtained the tuning mode start instruction (step S110: NO), the process in step S110 is repeated, and the instruction obtainer 47 stands by until the tuning mode start instruction is obtained. When, for example, the operation part is operated and the instruction obtainer 47 obtains the tuning mode start instruction (step S110: YES), the remote-end controller 46 controls the switch S3 in such a way that the output by the remote-end demodulator 44 is input to the outputter 45, thereby changing the route (step S120). When the route change in step S120 completes, the output by the outputter 45 that is a speaker becomes a silent status. The remote-end controller 46 notifies the remote-end communicator 41 of the start of the tuning mode, and the remote-end communicator 41 transmits the control signal for the notification of the start of the tuning mode to the wireless-device-end communicator 24 (step S130).

When the wireless-device-end communicator 24 of the wireless device 2 has not received the control signal for the notification of the start of the tuning mode (step S210: NO), the process in step S210 is repeated, and the wireless-device-end communicator 24 stands by until the control signal for the notification of the start of the tuning mode is received. When the wireless-device-end communicator 24 receives the control signal for the notification of the start of the tuning mode (step S210: YES), the wireless-device-end controller 25 controls the switch S1 in such a way that the output by the mixer 26c is input to the wireless-device-end communicator 24, thereby changing the route (step S220). When the route change in step S220 completes, the wireless-device-end communicator 24 transmits the control signal for the notification of the completion of the route change to the remote-end communicator 41 (step S230).

When the remote-end communicator 41 receives the control signal for the notification of the completion of the route change (step S140: YES), the remote-end controller 46 controls the switch S2 in such a way that the output by the remote-end communicator 41 is input to the mixer 43, thereby changing the route (step S150). When the route change in step S150 completes, and the tuning mode starts, the outputter 45 outputs sounds on the basis of the remote-end AF signal. When the tuning mode starts, as will be explained later, until the tuning mode ends, the outputter 45 outputs the remote-end AF signal generated by demodulating the IF signal in the remote terminal 4 in accordance with the frequency corresponding to the operation given to the operation part.

When the remote-end communicator 41 has not received the control signal for the notification of the completion of the route change (step S140: NO), and when a certain time period has not elapsed after the control signal for the notification of the start of the tuning mode is transmitted (step S160: NO), the process returns to step S140. When the remote-end communicator 41 has not received the control signal for the notification of the completion of the route change (step S140: NO), and when the certain time period has elapsed after the control signal for the notification of the start of the tuning mode is transmitted (step S160: YES), the remote-end controller 46 controls the switch S3 in such a way that the output by the remote-end communicator 41 via the switch S2 is input to the outputter 45, thereby changing back the route (step S170). In this case, the tuning mode does not start, and the status is returned to the status in which the outputter 45 outputs sounds on the basis of the wireless-device-end AF signal.

Figure 5:
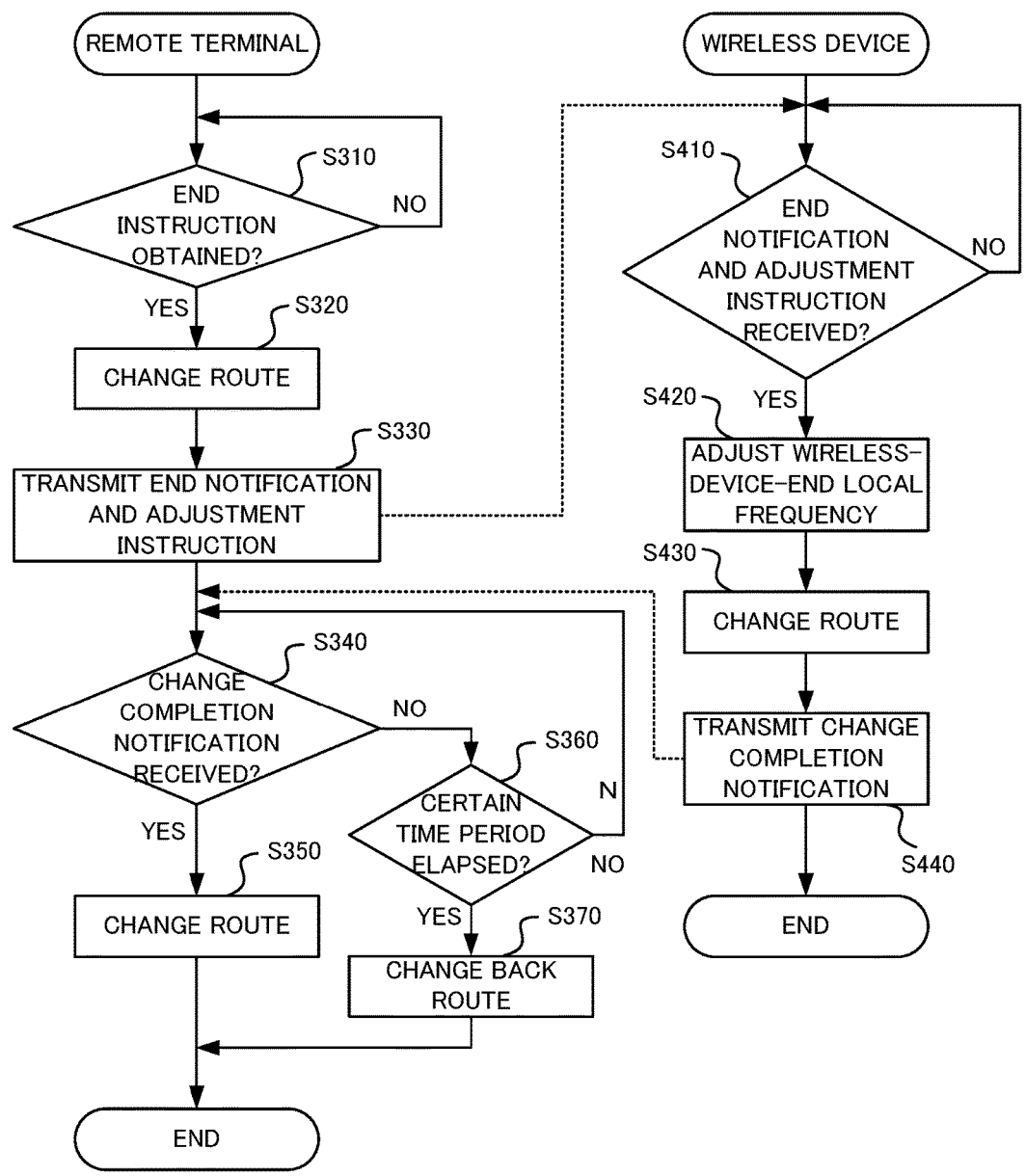
FIG. 5 is a flowchart illustrating an example operation of ending the tuning mode performed by the communication system according to the first embodiment.

FIG. 5 is a flowchart illustrating an example operation of ending the tuning mode performed by the communication system 1 according to the first embodiment. An explanation will be given of the operation of ending the tuning mode performed by the communication system 1 illustrated in FIG. 3. When the instruction obtainer 47 of the remote terminal 4 has not obtained the tuning mode end instruction (step S310: NO), the process in step S310 is repeated, and the instruction obtainer 47 stands by until the tuning mode end instruction is obtained. When the instruction obtainer 47 obtains the tuning mode end instruction (step S310: YES), the remote-end controller 46 controls the switch S3 in such a way that the output by the remote-end demodulator 44 is not input to the outputter 45, thereby changing the route (step S320). When the route change in step S320 completes, the output by the outputter 45 becomes a silent status. The remote-end controller 46 transmits the notification of the end of the tuning mode and the last adjustment instruction at the end of the tuning mode to the remote-end communicator 41, and the remote-end communicator 41 transmits the control signal for the notification of the end of the tuning mode and the control signal representing the last adjustment instruction to the end of the tuning mode to the wireless-device-end communicator 24 (step S330).

When the wireless-device-end communicator 24 of the wireless device 2 has not received the control signal for the notification of the end of the tuning mode and the control signal representing the last adjustment instruction to the end of the tuning mode (step S410: NO), the process in step S410 is repeated, and the wireless-device-end communicator 24 stands by until the control signal for the notification of the end of the tuning mode and the control signal representing the last adjustment instruction to the end of the tuning mode are received. When the wireless-device-end communicator 24 receives the control signal for the notification of the end of the tuning mode and the control signal representing the last adjustment instruction to the end of the tuning mode (step S410: YES), the wireless-device-end controller 25 adjusts the wireless-device-end local frequency of the wireless device 2 in accordance with the last adjustment instruction (step S420). The wireless-device-end controller 25 controls the switch S1 in such a way that the output by the wireless-device-end demodulator 23 is input to the wireless-device-end communicator 24, thereby changing the route (step S430). When the route change in step S430 completes, the wireless-device-end communicator 24 transmits, to the remote-end communicator 41, the control signal for the notification of the completion of the route change (step S440).

When the remote-end communicator 41 receives the control signal for the notification of the completion of the route change (step S340: YES), the remote-end controller 46 controls the switch S2 in such a way that the output by the remote-end communicator 41 is input to the outputter 45 via the switch S3, thereby changing the route (step S350). When the route change in step S350 completes, and the tuning mode ends, the outputter 45 outputs sounds on the basis of the wireless-device-end AF signal.

When the remote-end communicator 41 has not received the control signal for the notification of the completion of the route change (step S340: NO), and when a certain time period has not elapsed after the transmission of the control signal for the notification of the end of the tuning mode (step S360: NO), the process returns to step S340. When the remote-end communicator 41 has not received the control signal for the notification of the completion of the route change (step S340: NO), and when the certain time period has elapsed after the transmission of the control signal for the notification of the end of the tuning mode (step S360: YES), the remote-end controller 46 controls the switch S3 in such a way that the output by the remote-end demodulator 44 is input to the outputter 45, thereby changing back the route (step S370). In this case, the tuning mode is not terminated, and the outputter 45 outputs sounds on the basis of the wireless-device-end AF signal.

By switching the switches S1, S2 and S3 as appropriate at the time of the start of the tuning mode and at the time of the end thereof, an output of unnecessary sounds becomes preventable.

As explained above, according to the communication system 1 in the first embodiment, the tuning operation of the wireless device 2 through an operation at the remote terminal 4 connected thereto via the communication network 3 is facilitated.

Second Embodiment

The communication system 1 according to a second embodiment of the present disclosure employs the same configuration as that of the communication system 1 according to the first embodiment. The communication system 1 according to the second embodiment adjusts the wireless-device-end local frequency of the wireless device 2 in accordance with, when the reception frequency indicated by the adjustment instruction in the tuning mode exceeds the defined band, this reception frequency. In the second embodiment, when the reception frequency indicated by the adjustment instruction is equal to or higher than the upper limit value of the defined band or is equal to or lower than the lower limit value thereof, the reception frequency is regarded as exceeding the defined band, that is, the reception frequency is regarded as being outside of the band. Operations of the respective components in the communication system 1 according to the second embodiment and different from those of the first embodiment will be explained below.

When the reception frequency indicated by the adjustment instruction, which is obtained by the instruction obtainer 47 in the tuning mode, exceeds the defined band, the remote-end controller 46 transmits this adjustment instruction to the remote-end communicator 41. The remote-end communicator 41 transmits the control signal representing the adjustment instruction to the wireless-device-end communicator 24. When the wireless-device-end communicator 24 receives the control signal representing the adjustment instruction, the wireless-device-end controller 25 adjusts the wireless-device-end local frequency of the wireless device 2 in accordance with the reception frequency indicated by the adjustment instruction. Hence, the reception frequency indicated by the adjustment instruction becomes a frequency that falls in the defined band, and thus the operation in the tuning mode can be maintained.

An explanation will be given of an example case in which the reception frequency of the wireless device 2 is 7 MHz, and the defined band, that is, the bandwidth of the transmitted IF signal from the wireless device 2 is ±12 kHz. When the user operates the operation part of the remote terminal 4 to set the reception frequency to 7.012 MHz, the remote-end local frequency of the remote terminal 4 is in a status shifted by +12 kHz. In addition, since the reception frequency which is indicated by the adjustment instruction and which is 7.012 MHz is outside of the band, the remote-end communicator 41 transmits the control signal representing this adjustment instruction to the wireless-device-end communicator 24. When the wireless-device-end communicator 24 receives the control signal representing the adjustment instruction, the wireless-device-end controller 25 adjusts the wireless-device-end local frequency of the wireless device 2 in accordance with the reception frequency indicated by the adjustment instruction, thereby setting the reception frequency of the wireless device 2 to 7.012 MHz. The communication system 1 adjusts the wireless-device-end local frequency of the wireless device 2, and returns the remote-end local frequency of the remote terminal 4 to the un-shifted status from the status shifted by +12 kHz as explained above. Hence, because the range that is ±12 kHz relative to the center frequency that is 7.012 MHz is within the defined band, the operation in the tuning mode can be maintained.

Figure 6:
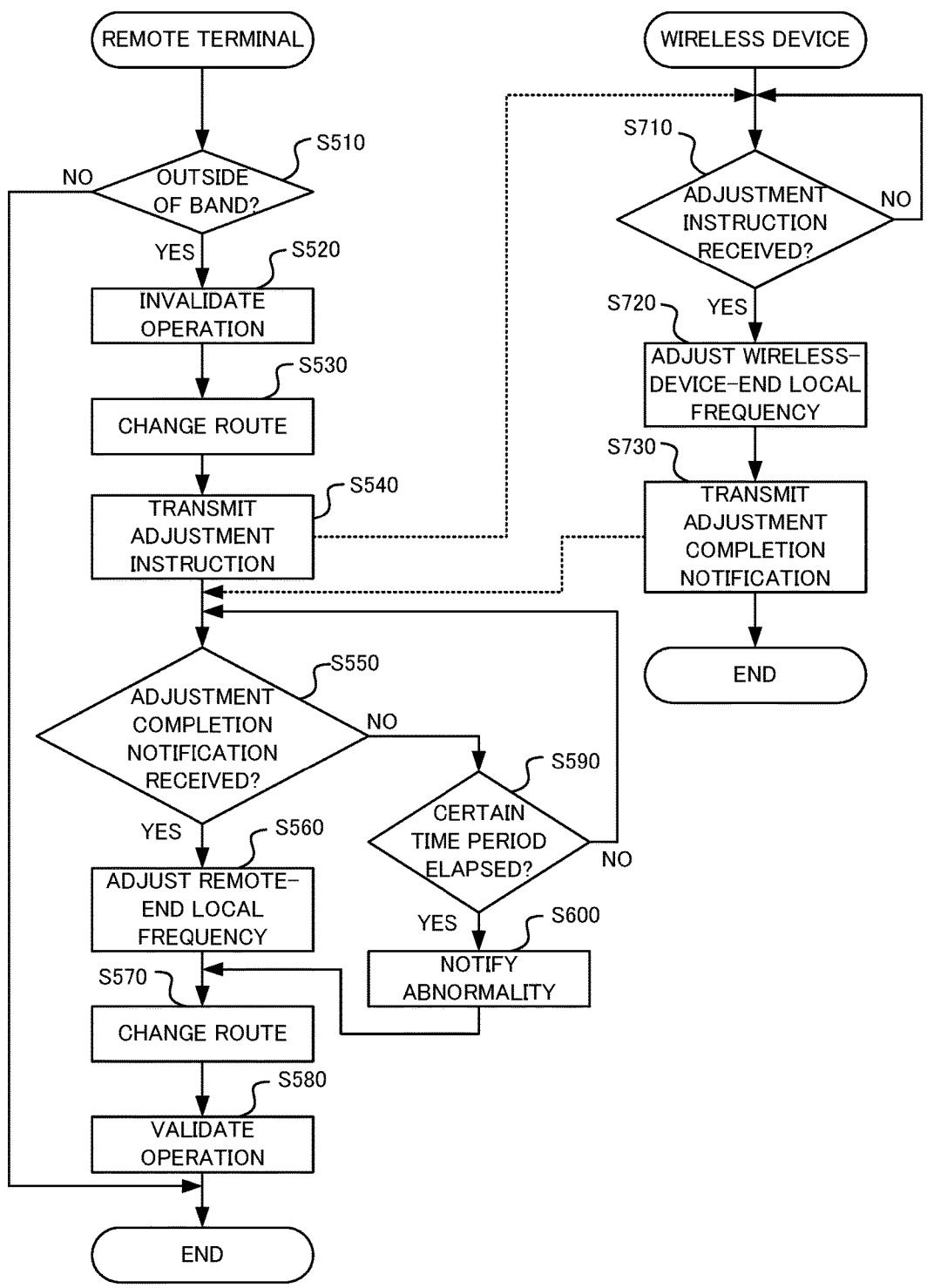
FIG. 6 is a flowchart illustrating an example operation of adjusting a band in the tuning mode performed by a communication system according to a second embodiment of the present disclosure.

FIG. 6 is a flowchart illustrating an example operation of adjusting the band in the tuning mode performed by the communication system 1 according to the second embodiment of the present disclosure. Every time the instruction obtainer 47 obtains the new adjustment instruction, the operation of adjusting the band illustrated in FIG. 6 is performed. When the reception frequency indicated by the adjustment instruction, which is obtained by the instruction obtainer 47, is within the defined band (step S510: NO), the process is ended. Conversely, when the reception frequency indicated by the obtained adjustment instruction by the instruction obtainer 47 is outside of the defined band (step S510: YES), the remote-end controller 46 invalidates the adjustment operation of the reception frequency through the operation part, and notifies the user of the invalidation of the operation by, for example, outputting notification sounds (step S520). The remote-end controller 46 may store the reception frequency of the wireless device 2 at the start of the tuning mode, and may determine whether or not the reception frequency indicated by the adjustment instruction is within the defined band on the basis of whether or not the difference between the stored reception frequency and the reception frequency indicated by the adjustment instruction is equal to or greater than a threshold. When, for example, the defined band is ±12 kHz, and when the difference between the stored reception frequency and the reception frequency indicated by the adjustment instruction is equal to or greater than 12 kHz or is equal to or less than −12 kHz, the remote-end controller 46 determines that the indicated reception frequency by the adjustment instruction is outside of the band.

The remote-end controller 46 controls the switch S3 in such a way that the output by the remote-end demodulator 44 is not input to the outputter 45, thereby changing the route (step S530). When the route change in step S530 completes, the output by the outputter 45 becomes a silent status. The remote-end controller 46 transmits the adjustment instruction to the remote-end communicator 41, and the remote-end communicator 41 transmits the control signal representing the adjustment instruction to the wireless-device-end communicator 24 (step S540).

When the wireless-device-end communicator 24 of the wireless device 2 has not received the control signal representing the adjustment instruction (step S710: NO), the process in step S710 is repeated, and the wireless-device-end communicator 24 stands by until the control signal representing the adjustment instruction is received. When the wireless-device-end communicator 24 receives the control signal representing the adjustment instruction (step S710: YES), the wireless-device-end controller 25 adjusts the wireless-device-end local frequency in accordance with the reception frequency indicated by the adjustment instruction (step S720). When the adjustment of the wireless-device-end local frequency in step S720 completes, the wireless-device-end communicator 24 transmits, to the remote-end communicator 41, the control signal for the notification of the completion of the adjustment (step S730).

When the remote-end communicator 41 receives the control signal for the notification of the completion of the adjustment (step S550: YES), the remote-end controller 46 adjusts the remote-end local frequency in accordance with the reception frequency indicated by the adjustment instruction, which is obtained by the instruction obtainer 47 (step S560). When the adjustment of the remote-end local frequency in step S560 completes, the remote-end controller 46 controls the switch S3 in such a way that the output by the remote-end demodulator 44 is input to the outputter 45, thereby changing the route (step S570). When the route change in step S570 completes, the outputter 45 outputs sounds on the basis of the remote-end AF signal. The remote-end controller 46 validates the adjustment operation of the reception frequency through the operation part, and notifies the user of the validation of the operation by, for example, outputting a notification sound (step S580). When the adjustment operation of the reception frequency through the operation part is validated by the process in step S580, the operation in the tuning mode becomes maintainable, and until the tuning mode ends, the outputter 45 outputs sounds on the basis of the remote-end AF signal in accordance with the frequency corresponding to the operation given to the operation part.

When the remote-end communicator 41 has not received the control signal for the notification of the completion of the adjustment (step S550: NO), and when a certain time period has not elapsed after the transmission of the control signal representing the adjustment instruction (step S590: NO), the process returns to step S550. When the remote-end communicator 41 has not received the control signal for the notification of the completion of the adjustment (step S550: NO), and when the certain time period has elapsed after the transmission of the control signal representing the adjustment instruction (step S590: YES), the remote-end controller 46 notifies the user of an abnormality by, for example, outputting a notification sound from the outputter 45 (step S600). When the abnormality occurs during the operation of adjusting the band as explained above, the processes in steps S570 and S580 are executed subsequent to the process in step S600, and the tuning mode is maintained. Alternatively, when the abnormality occurs during the operation of adjusting the band as explained above, the mode may be transitioned to the normal mode without maintaining the tuning mode. For example, after step S600 in FIG. 6, the operation of adjusting the band illustrated in FIG. 6 may be terminated, and the process subsequent to step S330 in FIG. 5 may be executed. In this case, after the transition to the normal mode, like step S580 in FIG. 6, the adjustment operation of the reception frequency through the operation part is validated.

As explained above, according to the communication system 1 in the second embodiment, the tuning operation of the wireless device 2 through the operation given to the remote terminal 4 connected thereto via the communication network 3 is facilitated, and the operation in the tuning mode can be maintained even if the reception frequency instructed by the user operation exceeds the defined band.

When the instructed reception frequency by the user operation in the tuning mode exceeds the defined band, the mode may be transitioned to the normal mode without maintaining the tuning mode. In addition to the above example case, also, the instruction obtainer 47 determines that the tuning mode end instruction is obtained when the indicated reception frequency by the adjustment instruction exceeds the defined band. In this case, the last adjustment instruction at the end of the tuning mode indicates the reception frequency that exceeds the defined band. When, in the tuning mode, the range of the reception frequency that can be instructed by the user operation given to the operation part is set to be equal to or greater than the lower limit value of the defined band, and is equal to or less than the upper limit value of the defined band, the indicated reception frequency by the adjustment instruction transmitted in step S330 is the upper limit value of the defined band or the lower limit value thereof. When, for example, the reception frequency of the wireless device 2 at the time of the start of the tuning mode is 7 MHz, and the defined band is a range of ±12 kHz, the indicated reception frequency by the adjustment instruction transmitted in step S330 is 7.012 MHz or 6.988 MHz.

The present disclosure is not limited to the above embodiments. The configuration of the communication system 1 in the above embodiments is merely an example, and for example, a host PC connected to the wireless device 2 may accomplish the function of the wireless-device-end communicator 24. The wireless device 2 may have only the receiving function, and may be a transceiver that has both transmitting and receiving functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A communication system comprising a wireless device and a remote terminal connected to the wireless device via a communication network, and including a tuning mode for a tuning operation, wherein:

the wireless device comprises:
a frequency converter to perform, on a basis of a wireless-device-end local frequency, a frequency conversion on a reception signal on a basis of a radio wave captured by an antenna, and output an intermediate frequency (IF) signal;
a wireless-device-end demodulator to demodulate the IF signal, and output a wireless-device-end audio frequency (wireless-device-end AF) signal that is the demodulated signal;
a wireless-device-end communicator to transmit the IF signal and the wireless-device-end AF signal to the remote terminal, and exchange a control signal with the remote terminal; and
a wireless-device-end controller to adjust the wireless-device-end local frequency,
the remote terminal comprises:
an instruction obtainer to obtain an adjustment instruction of a reception frequency;
a remote-end communicator to receive the IF signal and the wireless-device-end AF signal from the wireless device, and exchange a control signal with the wireless device;
a remote-end demodulator to demodulate the received IF signal on a basis of a remote-end local frequency, and output a remote-end audio frequency (remote-end AF) signal that is the demodulated signal;
a remote-end controller to adjust the remote-end local frequency in accordance with the adjustment instruction obtained by the instruction obtainer in the tuning mode; and
an outputter to output the remote-end AF signal output by the remote-end demodulator in the tuning mode, and output the wireless-device-end AF signal received by the remote-end communicator in a mode other than the tuning mode,
wherein:
the remote-end communicator is to transmit the control signal representing the last adjustment instruction at an end of the tuning mode, and
when the wireless-device-end communicator receives the control signal representing the last adjustment instruction, the wireless-device-end controller is to adjust the wireless-device-end local frequency in accordance with the last adjustment instruction.

2. The communication system according to claim 1, wherein:
when the reception frequency indicated by the adjustment instruction in the tuning mode exceeds a defined band, the remote-end communicator is to transmit the control signal representing the adjustment instruction, and
when the wireless-device-end communicator receives the control signal representing the adjustment instruction, the wireless-device-end controller is to adjust the wireless-device-end local frequency in accordance with the adjustment instruction.

3. The communication system according to claim 2, wherein:
the remote-end communicator is to transmit the control signal for a notification of a start of the tuning mode at the start of the tuning mode, and is to transmit the control signal for a notification of an end of the tuning mode at the end of the tuning mode,
the wireless-device-end communicator is to receive the control signal for the notification of the start of the tuning mode and the end of the tuning mode, transmit the IF signal in the tuning mode and transmit the wireless-device-end AF signal in the mode other than the tuning mode in accordance with the control signal, and the remote-end communicator is to receive the IF signal in the tuning mode, and receive the wireless-device-end AF signal in the mode other than the tuning mode.

4. The communication system according to claim 2, wherein in both the tuning mode and the mode other than the tuning mode, the wireless-device-end communicator is to transmit both the IF signal and the wireless-device-end AF signal, and the remote-end communicator is to receive both the IF signal and the wireless-device-end AF signal.

5. The communication system according to claim 1, wherein:
the remote-end communicator is to transmit the control signal for a notification of a start of the tuning mode at the start of the tuning mode, and is to transmit the control signal for a notification of an end of the tuning mode at the end of the tuning mode,
the wireless-device-end communicator is to receive the control signal for the notification of the start of the tuning mode and the end of the tuning mode, transmit the IF signal in the tuning mode and transmit the wireless-device-end AF signal in the mode other than the tuning mode in accordance with the control signal, and
the remote-end communicator is to receive the IF signal in the tuning mode, and receive the wireless-device-end AF signal in the mode other than the tuning mode.

6. The communication system according to claim 1, wherein in both the tuning mode and the mode other than the tuning mode, the wireless-device-end communicator is to transmit both the IF signal and the wireless-device-end AF signal, and the remote-end communicator is to receive both the IF signal and the wireless-device-end AF signal.

7. A frequency control method executed by a communication system comprising a wireless device and a remote terminal connected to the wireless device via a communication network, and including a tuning mode for a tuning operation, the method comprising:
performing, on a basis of a wireless-device-end local frequency, a frequency conversion on a reception signal on a basis of a radio wave captured by an antenna of the wireless device to generate an intermediate frequency (IF) signal;
generating, at the wireless device, a wireless-device-end audio frequency (wireless-device end AF) signal that is the demodulated IF signal;
generating, at the remote terminal, a remote-end audio frequency (remote-end AF) signal that is the demodulated IF signal on a basis of a remote-end local frequency;
obtaining an adjustment instruction of a reception frequency;
adjusting, in the tuning mode, the remote-end local frequency in accordance with the obtained adjustment instruction, and adjusting the wireless-device-end local frequency in accordance with the last adjustment instruction at an end of the tuning mode; and
outputting the remote-end AF signal from the remote terminal in the tuning mode, and outputting the wireless-device-end AF signal from the remote terminal in a mode other than the tuning mode.

8. The frequency control method according to claim 7, further comprising adjusting, when the reception frequency indicated by the adjustment instruction in the tuning mode exceeds a defined band, the wireless-device-end local frequency in accordance with the adjustment instruction.

9. A remote terminal including a tuning mode for a tuning operation, the remote terminal comprising:

an instruction obtainer to obtain an adjustment instruction of a reception frequency for a wireless device connected via a communication network;
a remote-end communicator to receive, from the wireless device, an intermediate frequency (IF) signal generated by performing, on a basis of a wireless-device-end local frequency, a frequency conversion on a reception signal on a basis of a radio wave captured by an antenna of the wireless device, and a wireless-device-end audio frequency (wireless-device-end AF) signal that is a signal generated by demodulating the IF signal, and exchange a control signal with the wireless device;
a remote-end demodulator to demodulate the received IF signal on a basis of a remote-end local frequency, and output a remote-end audio frequency (remote-end AF) signal that is the demodulated signal;
a remote-end controller to adjust the remote-end local frequency in accordance with the adjustment instruction obtained by the instruction obtainer in the tuning mode; and
an outputter to output the remote-end AF signal output by the remote-end demodulator in the tuning mode, and output the wireless-device-end AF signal received by the remote-end communicator in a mode other than the tuning mode,
wherein the remote-end communicator is to transmit the control signal representing the last adjustment instruction at an end of the tuning mode.

10. The remote terminal according to claim 9, wherein the remote-end communicator is to transmit, when the reception frequency indicated by the adjustment instruction in the tuning mode exceeds a defined band, the control signal representing the adjustment instruction.

11. The remote terminal according to claim 10, wherein the remote-end communicator is to transmit the control signal for a notification of a start of the tuning mode at the start of the tuning mode, is to transmit the control signal for a notification of an end of the tuning mode at the end of the tuning mode, is to receive the IF signal in the tuning mode, and is to receive the wireless-device-end AF signal in the mode other than the tuning mode.

12. The remote terminal according to claim 10, wherein in both the tuning mode and the mode other than the tuning mode, the remote-end communicator receives both the IF signal and the wireless-device-end AF signal.

13. The remote terminal according to claim 9, wherein the remote-end communicator is to transmit the control signal for a notification of a start of the tuning mode at the start of the tuning mode, is to transmit the control signal for a notification of an end of the tuning mode at the end of the tuning mode, is to receive the IF signal in the tuning mode, and is to receive the wireless-device-end AF signal in the mode other than the tuning mode.

14. The remote terminal according to claim 9, wherein in both the tuning mode and the mode other than the tuning mode, the remote-end communicator receives both the IF signal and the wireless-device-end AF signal.

15. A non-transitory computer-readable recording medium having stored therein a program that causes a computer to:
obtain an adjustment instruction of a reception frequency for a wireless device connected via a communication network;
receive an intermediate frequency (IF) signal generated by performing, on a basis of a wireless-device-end local frequency, a frequency conversion on a reception signal on a basis of a radio wave captured by an antenna of the wireless device, and a wireless-device-end audio frequency (wireless-device-end AF) signal that is a signal generated by demodulating the IF signal;

demodulate the received IF signal on a basis of a remote-end local frequency, and generate a remote-end audio frequency (remote-end AF) signal that is the demodulated signal;

adjust the remote-end local frequency in accordance with the obtained adjustment instruction in a tuning mode for a tuning operation;

output the remote-end AF signal generated by demodulating the received IF signal in the tuning mode, and output the received wireless-device-end AF signal in a mode other than the tuning mode; and transmit a control signal representing the last adjustment instruction at an end of the tuning mode to the wireless device.

* * * * *